US008305642B2

United States Patent
Taylor et al.

(10) Patent No.: US 8,305,642 B2
(45) Date of Patent: Nov. 6, 2012

(54) METHOD AND SYSTEM FOR CORRELATING OF UNIFORMITY COMPENSATIONS ACROSS HALFTONE SCREENS

(75) Inventors: Douglas Raymond Taylor, Webster, NY (US); Brian Robert Conrow, Webster, NY (US); Shawn Patrick Updegraff, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 991 days.

(21) Appl. No.: 12/340,068

(22) Filed: Dec. 19, 2008

(65) Prior Publication Data

US 2010/0157373 A1    Jun. 24, 2010

(51) Int. Cl.
G06K 15/00 (2006.01)
H04N 1/405 (2006.01)

(52) U.S. Cl. ......... 358/3.06; 358/1.9; 358/3.2; 358/534; 358/536

(58) Field of Classification Search .................. None
See application file for complete search history.

(56) References Cited

U.S. PATENT DOCUMENTS

| 5,649,073 | A | * | 7/1997 | Knox et al. | 358/1.9 |
|---|---|---|---|---|---|
| 5,689,344 | A | * | 11/1997 | Ebner | 358/2.1 |
| 6,141,464 | A | * | 10/2000 | Handley | 382/287 |
| 6,694,109 | B1 | * | 2/2004 | Donaldson et al. | 399/49 |
| 6,697,582 | B1 | * | 2/2004 | Scheuer | 399/49 |
| 6,760,056 | B2 | * | 7/2004 | Klassen et al. | 347/251 |
| 7,239,820 | B2 | * | 7/2007 | Donaldson | 399/49 |
| 7,315,394 | B2 | * | 1/2008 | Klassen et al. | 358/1.9 |
| 2004/0136013 | A1 | * | 7/2004 | Mestha et al. | 358/1.9 |
| 2006/0077488 | A1 | * | 4/2006 | Zhang et al. | 358/504 |
| 2006/0077489 | A1 | * | 4/2006 | Zhang et al. | 358/504 |
| 2007/0109394 | A1 | * | 5/2007 | Updegraff et al. | 347/238 |

* cited by examiner

*Primary Examiner* — King Poon
*Assistant Examiner* — Richard Zhu
(74) *Attorney, Agent, or Firm* — Fay Sharpe LLP

(57) ABSTRACT

A method and system are provided for characterizing performance of a printer across a plurality of halftone screens. A first non-uniformity profile is generated by measuring printer performance. Cross-position differences between the first non-uniformity profile and selected corresponding cross-positions of a second halftone screen are detected. A scaling factor is computed relating the detected differences. Printer performance with the second halftone screen is predicted by applying the scaling factor associated with the second halftone screen to the non-uniformity profile of the first halftone screen.

15 Claims, 2 Drawing Sheets

METHOD AND SYSTEM FOR CORRELATING OF UNIFORMITY COMPENSATIONS ACROSS HALFTONE SCREENS

TECHNICAL FIELD

The presently disclosed embodiments are directed to color printing and display systems; and especially color characterization of such systems.

BACKGROUND

In today's business and scientific world, color has become essential as a component of communication. Color facilitates the sharing of knowledge and ideas. Companies involved in the development of digital color print engines are continuously looking for ways to improve the total image quality of their products. One of the elements that affects image quality is the ability to consistently produce the same quality image output on an imaging device or printer from one day to another, from one week to the next, month after month. Colors on a printer tend to drift over time due to ink/toner variations, temperature fluctuations, type of media used, environment, etc. There has been a long felt commercial need for efficiently maintaining print color predictability, particularly as electronic marketing has placed more importance on the accurate representation of merchandise in illustrative print or display media.

Color printing characterization is a crucial task in color management. The characterization process essentially establishes a relationship between device dependent, e.g. printer CMY, and device independent, e.g. CIELAB values. Several color management tasks such as derivation of ICC profiles, color transforms for calibration, etc. benefit from an accurate mathematical characterization of the physical device. For color printers, characterization is an expensive process involving large numbers of patch measurements and subsequent computation to derive satisfactorily accurate color lookup-tables (LUTs). Further, this process is halftone dependent, i.e. patch printing, measuring and associated computation scales proportionally with the number of halftoning methods. Most high-end color printers are equipped with multiple halftone screens and hence a method for printer characterization that can minimize required patch measurement is very desirable.

Color printer characterization is the process of deriving a mathematical transform which relates printer CMY(K) to its corresponding device independent representation, e.g. spectral, CIELAB, etc. The forward characterization transform defines the response of the device to a known input, thus describing the color characteristics of the device. The inverse characterization transform compensates for these characteristics and determines the input to the device that is required to obtain a desired response. For the printers hence, a CMY(K)→CIELAB mapping represents a forward characterization transform while the CIELAB→CMY(K) map is an inverse transform. Herein the characterization color transform will be used to refer unambiguously to the forward transform; suitable inversion methods can be used to derive the corresponding inverse transform. The characterization transform is of immense value in many color management tasks such as derivation of ICC profiles for the printer, printer calibration, color control, etc.

The most popular technique to build a printer characterization transform involves printing and measuring a large set of color samples, i.e. CMY(K) patches, in conjunction with mathematical fitting and interpolation to derive CMY(K)→Lab mappings. The accuracy of the characterization transform clearly depends on the number (N) of patches printed and measured. Crucially, note that these patches correspond to contone CMY digital values, i.e. their binary representation is halftone dependent. Hence, deriving characterization transforms for a printer equipped with M halftone screens, requires N*M patches. Even for modest choices of N, M, e.g. N=1000, M=4, this number grows to be unmanageable. Note N cannot be made very small without compromising accuracy. As multiple media are thrown into the mix, the number scales further with the number of distinct media employed, i.e. N×M×P patches are needed where P distinct media types are used.

One aspect of patch measurement comprises generating multiple full-width patches of a single density across the whole printer page or photoreceptor belt i.e. the entire cross-process position of the printing machine. Such full-width patches are measured by a full-width array sensor during cycle up to obtain a printer model of the tone reproduction curve (TRC) at each inboard to outboard pixel column. The measurement can then show the amount of toner or print ink printed at each position on that page by the particular halftone screen then used. Any variations in the TRCs (i.e. variations from the true intended color) are compensated for in the image path via remapping of the halftone TRC. Such remapping is typically referred to as spatially varying TRC corrections (SVT) and these remappings are unique for each color and each halftone screen.

As noted above, as the number of selectable halftone screens increase for a particular device, the time it would take to print and measure patches for each halftone screen to build corresponding SVTs would quickly exceed any cycle up time targets. Since the necessary patches are also measured during run time, the time between SVT updates for any one screen depends on the number of screens that are being measured.

There is thus a need for a system for correlating uniformity compensations across different halftone screens that eliminates the need for separate uniformity measurements to be made on each halftone screen needing compensation for acceptable accuracy. Correlation would enable a reduced set of measurements to be made, thereby enhancing efficiency in the printer characterization process.

BRIEF SUMMARY

The subject embodiments provide a method for correlating uniformity compensation across different halftone screens. More particularly, the embodiments relate to a print engine non-uniformity compensation method that eliminates the need for separate uniformity measurements on each halftone screen pattern (e.g., at different dot frequencies) during cycle up time as well as at run time. It is known that xerographic cross-process non-uniformities (i.e. streaks) in a print engine scale with screen frequency of the halftone dot, and uniformity characteristics are similar regardless of the halftone screen used for printing. Therefore, knowing the measured non-uniformity of one halftone screen enables the prediction of the non-uniformity of another halftone screen thereby enabling the modeling of the uniformity profile of the second halftone screen as a scale version of the measured profile of the first halftone screen. Typically the scaling is done about the mean of the uniformity profile. Scale factors can be generated offline in advance based on maximizing image quality with metrics and can change as a function of input density. The subject embodiments are thus useful for reducing the time and cost of making repeated uniformity measurements on different halftone screens with a reasonable and acceptable trade off in uniformity compensation performance.

In accordance with the present embodiments a method is provided for correlating uniformity compensation in a printer across different halftone screens. A first uniformity compensation profile is generated comprising a tone reproduction curve (TRC) at each inboard to outboard pixel column and first spatially varying TRC corrections (SVT) for a first set of printer colors printed with a first halftone screen by measuring printer performance relative to a target set of characterizing patches. Corrected printer performance for a second set of printer colors printed with a second halftone screen is modeled by scaling the first SVT with a scaling factor to generate a second SVT corresponding to the second halftone screen. A second uniformity compensation profile for the second set of printer colors and the second halftone screen is predicted in accordance with the modeling for reducing printer performance measurements in generating the second SVT.

The first and second uniformity compensation profiles are correlated by the equation $R'(x)=S*R(x)+\bar{R}*(1-S)$ where $R_{(x)}$ is a halftone patch profile comprising the first uniformity compensation profile, S is the scaling factor and $R_{(x)}$ is a halftone patch profile and $R'_{(x)}$ is a halftone patch profile corresponding to the second uniformity compensation profile.

DETAILED DESCRIPTION

Aspects of the exemplary embodiments relate to a system and method for performance characterization of an imaging device such as a printer and particularly finds application in automated printer calibration and other color management applications wherein a plurality of halftone screens are accessible by the printer for improved accuracy in color imaging. More particularly, the subject embodiments provide a method for correlating uniformity compensations across different halftone screens. It is understood that xerographic cross-process non-uniformities (i.e. streaks) in a print engine scale with screen frequency of the halftone dot, and uniformity characteristics are similar regardless of the halftone screen used for printing. This knowledge enables the prediction of one halftone screen non-uniformity based on the measured non-uniformity of another halftone screen. Thus, by only having to measure the non-uniformity of a single halftone screen, one is able to predict the non-uniformity within acceptable standards of other halftone screens. The embodiments are useful for reducing the time and cost of making repeated uniformity measurements on the remaining different halftone screens.

Figure 1:
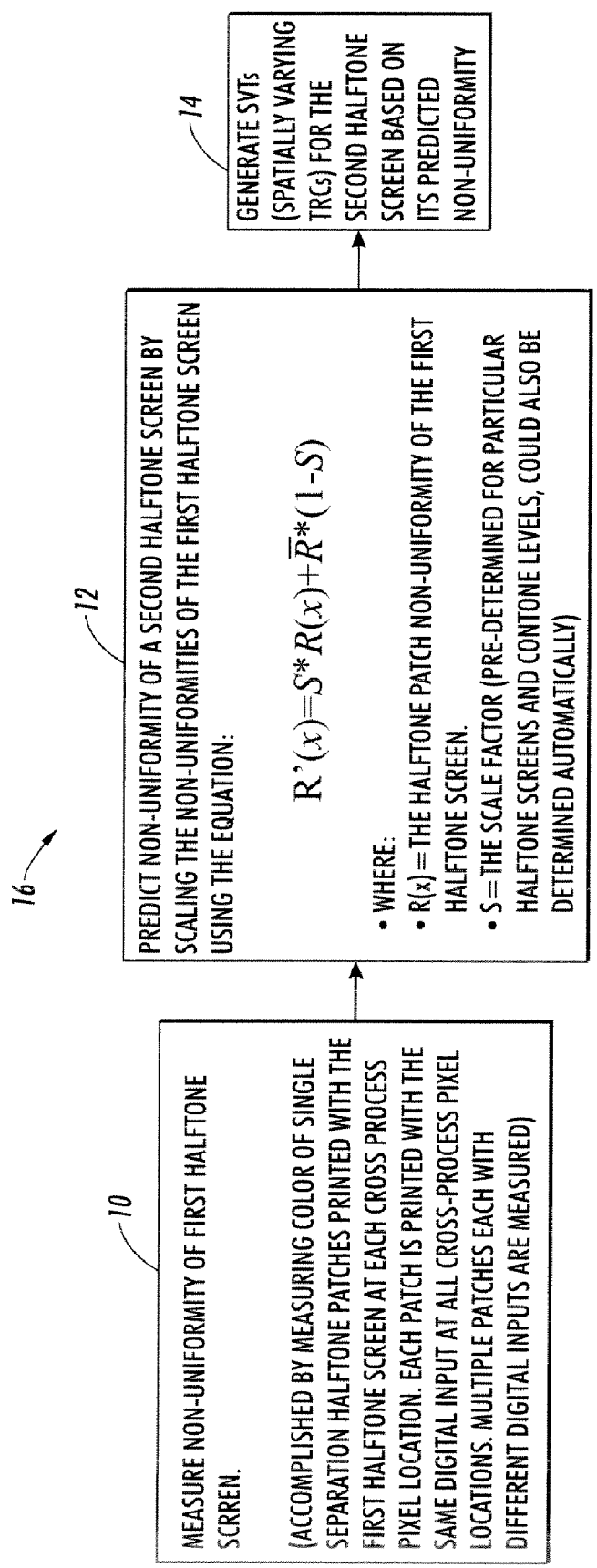
FIG. 1 is a functional block diagram of an exemplary uniformity compensation system in accordance with aspects of the exemplary embodiment.

FIG. 1 embodies the subject method of measuring the non-uniformity of a first halftone screen 10, predicting the non-uniformity of a second halftone screen by scaling the measured non-uniformities of the first halftone screen 12 and then generating 14 SVTs for the second halftone screen based on the predicted non-uniformities as will be detailed more fully below.

Figure 2:
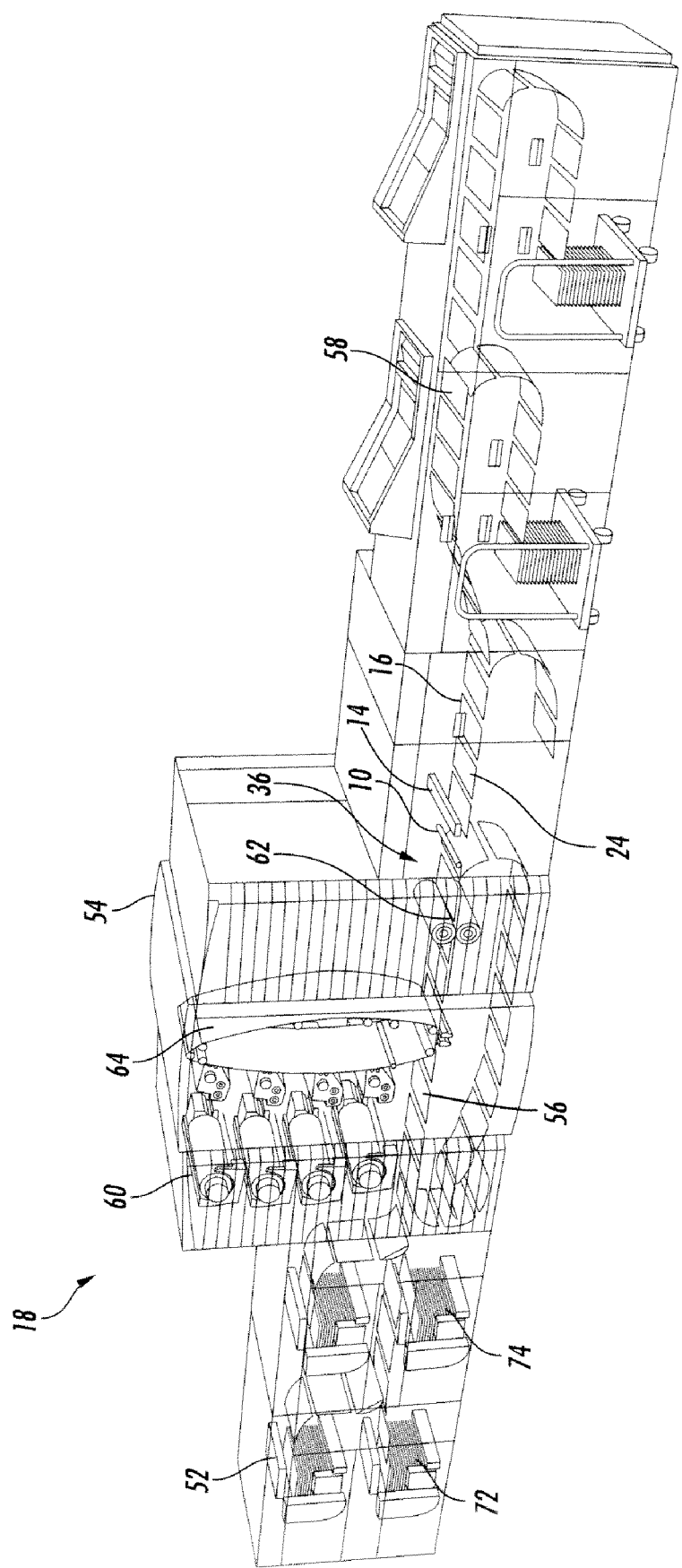
FIG. 2 is an exemplary embodiment of a printing system including process control for uniformity compensation in accordance with the system of FIG. 1.

To illustrate the exemplary spectrophotometric color measurement system 10 in situ, FIG. 2 shows an exemplary color output device 18 in the form of a digital color printing device. Printer 18 includes a source 52 of paper or other print media substrate 24, such as a paper feeder. The feeder 52 is connected to a marking engine 54, by a paper path 56, which includes output path 16 and which connects the marking engine 54 with a finisher 58. As illustrated, the marking engine 54 is a multi-color engine having a plurality of imaging/development subsystems 60, that are suitable for producing individual color images (e.g., with four color separations CMYK) on a photoreceptor 64 in the form of a belt. The belt then transfers the images to the print media substrate 24, here shown as sheets of paper. The first spectral sensor 14, such as a full-width array (FWA) scan bar, measures color values of test patches, either on the belt 64 or on the paper 24. The measured color reflectivities of a set of test patches, e.g., about 300 or 1000 printed color test patches, are then spatially mapped to corresponding corrected color values measured on the cool (e.g., ambient) test patches by a second spectral sensor 70 and are input to the processing system 16 (FIG. 1). Thereafter, the system 16 can, during cycle up times as well as at run times, correlate different halftone screen images to generate the desired SVTs for the different halftone screens used by the printer 18. Printed sheets passing the spectral sensor 14 are conveyed along the paper path 16 to the finisher 58 downstream of the marking engine 54.

While the printing system 18 is described as having four color separations (C, M, Y, and K), it is to be appreciated that fewer or more color separations may be employed in printing the test patches, such as 2, 3, 6, or more color separations. Additionally, while the color output device 18 is shown as having a single in-line sensor 14, it is also contemplated that the color output device 18 may include two or more marking engines in series and/or in parallel, each with its own in-line spectral sensor 14 in the output path. In alternate embodiments, two or more marking engines may have a common output path 16 in which a common sensor is located.

The spectral sensor 14 may output the color values in any convenient color space, such as L*, a*, b*, XYZ, or the like, depending on the desired color description. The spectrophotometer is typically suited to non-contact measurement of colored target areas such as test patches on moving printed test sheets in an output path of a color printer, where test patches may be sequentially angularly illuminated with multiple different colors, and a photosensor providing electrical signals in response. The spectrophotometer includes a lens system for transmitting the reflected illumination (from multiple illumination sources, such as approximately eight or more individual LEDs) from the test patch to the detector. The exemplary spectrophotometer provides non-contact color measurements of moving color target areas variably displaced therefrom within normal paper-path baffle spacings.

Referring again to FIG. 1, uniformity measurements can be made using a variety of sensors both on paper or further upstream in the xerographic development process. These measurements quantify the cross-process color variation of a print engine and are typically represented as a color or reflectance metric verses cross-process position. Measuring uniformity enables the possibility of digitally compensating for the non-uniformities. Imperfections in the xerographic process that cause non-uniformities manifest themselves slightly differently depending on the halftone screen used for printing.

The measuring 10 of the non-uniformities of the first halftone screen is typically accomplished by measuring colors of a single separation halftone patches printed with the first halftone screen in each cross-process pixel location. Each patch is printed with the same digital input at all cross-process pixel locations. Typically, multiple patches are measured each with different digital inputs. The measurements are then used to generate a first uniformity compensation profile comprising a tone reproduction curve (TRC) and first spatially varying TRC corrections (SVT) for a first set of printer colors printed with the first halftone screen by measuring printer performance relative to the target set of characterizing patches.

Modeling corrected printer performance or a second set of printer colors printed with a second halftone screen is accomplished by scaling 12 the first SVT with a scaling factor to generate a second SVT corresponding to the second halftone screen. Scale factors can be generated offline in advance based on maximizing image quality with metrics and can change as a function of input density.

This can be accomplished by measuring halftone patches printed with a first and second halftone screen under similar xerographic conditions (i.e. same print engine, same point in time). A scale factor can then be chosen such that the uniformity characteristics of E(x) in the following equation is most desirable.

$$R_2(x) = S*R_1(x) + \overline{R}_1*(1-S) + E(x)$$

Where:
$R_1(x)$=Measured halftone patch uniformity of patch printed with first halftone screen.
$R_2(x)$=Measured halftone patch uniformity of patch printed with second halftone screen.
S=Scale factor.
$\overline{R}_1$=Average of $R_1(x)$ across all x.
E(x)=Resulting error.
x=Cross-process pixel location.

A correlation between any two halftone screens can be developed and used to adequately predict the non-uniformity of one halftone screen based on the measured non-uniformity of another halftone screen. The basic assumption is that the 1-D uniformity profile printed with one screen equals the 1-D profile printed with another screen scaled about the mean by some scaling factor pus an error. Determining the optimal scaling factor should be based on maximizing image quality metrics of the error rather than standard correlation methods. Although standard correlation methods can be used for determining optimum scaling factors, this will most likely result in suboptimal image quality performance since minimizing squared error does not meet image quality objectives.

Generating 14 SVTs corresponding to a plurality of different halftone screens from the first halftone screen involves generating a second uniformity compensation profile about the mean of the first SVT, $\overline{R}$. The embodiments allow generating a plurality of scaling factors associated, respectively, with the plurality halftone screens utilized by the printer.

Measuring the SVT cross-position differences comprises a same color total ink density difference per pixel location and computing an average difference between the detected cross-position differences to compute the scaling factor.

Thus, the predicting 12 results in generating 14 spatially varying TRCs for each of the second halftone screens based on the predicted and computed non-uniformities generated by the foregoing equation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The claims can encompass an embodiment in hardware, software, or a combination thereof.

The word "printer" as used herein encompasses any apparatus, such as a digital copier, bookmaking machine, facsimile machine, multi-function machine, etc. which performs a print outputting function for any purpose.

What is claimed is:

1. A method for correlating uniformity compensation in a printer across different halftone screens, including:
   generating a first uniformity compensation profile comprising a tone reproduction curve (TRC) and first spatially varying TRC corrections (SVT) for a first set of printer colors printed with a first halftone screen by measuring printer performance relative to a target set of characterizing patches;
   modeling corrected printer performance for a second set of printer colors printed with a second halftone screen by scaling the first SVT with a scaling factor to generate a second SVT corresponding to the second halftone screen about the mean of the first SVT; and,
   predicting a second uniformity compensation profile for the second set of printer colors and the second halftone screen in accordance with the modeling for reducing printer performance measurements in generating the second SVT,
      wherein the first and second uniformity compensation profiles are correlated by the equation $R'(x)=S*R(x)+\overline{R}*(1-S)$ where $R_{(x)}$ is a halftone patch reflectance profile comprising the first uniformity compensation profile, S is the scaling factor generated in accordance with at least one maximized image quality metric, $\overline{R}$ is the mean of $R_{(x)}$ and $R'_{(x)}$ is a halftone patch profile corresponding to the second uniformity compensation profile.

2. The method of claim 1 wherein the modeling includes measuring a relationship between the TRC of the first halftone screen and a TRC of the second halftone screen, and wherein the measured relationship comprises the scaling factor.

3. The method of claim 2 wherein a plurality of scaling factors are associated, respectively, with a plurality of halftone screens utilized by the printer.

4. The method of claim 3 wherein the predicting a plurality of uniformity compensation profiles corresponding, respectively, to the plurality of halftone screens, is limited to only measuring SVT, cross-position differences per corresponding halftone screen.

5. The method of claim 4 wherein the measuring the SVT cross-position differences comprises a same color toner or ink density difference per pixel location.

6. The method of claim 5 wherein the predicting includes assuming the measured SVT cross-position differences will be relatively consistent across cross pixel positions over time.

7. The method of claim 3 wherein the second uniformity compensation profile comprises a mean measured SVT cross-position difference generated from measuring a plurality of SVT cross-position differences between the first halftone screen SVT and the second halftone screen.

8. A method of characterizing performance of a printer across a plurality of halftone screens, comprising:
   generating a first non-uniformity profile of a first halftone screen by measuring printer performance;
   detecting cross-position differences between the first non-uniformity profile and selected corresponding cross-positions of a second half tone screen;
   computing a scaling factor relating the detected differences and in accordance with at least one maximized image quality metric; and predicting printer performance with the second halftone screen by applying the scaling factor associated with the second halftone screen to the non-uniformity profile of the first halftone screen using the equation $R'(x)=S*R(x)+\bar{R}*(1-S)$ where $R_{(x)}$ is a reflectance profile comprising halftone patch non-uniformities of the first halftone screen, S is the scaling factor, $\bar{R}$ is the mean of $R_{(x)}$, and $R'_{(x)}$ is a reflectance profile of the second halftone screen.

9. The method of claim 8 wherein the computing includes an average difference between the detected cross-position differences.

10. The method of claim 8 wherein the predicting includes generating a spatially varying tone reproduction curve for the second halftone screen based on predicting non-uniformities of the second halftone screen with the scaling factor.

11. The method of claim 10 wherein the generating the first non-uniformity profile includes measuring a color of single separation halftone patches printed with the first halftone screen at each cross-process pixel location wherein each of the patches comprises a same digital input at all cross-process pixel locations.

12. The method of claim 11 wherein the generating the first non-uniformity profile further includes measuring a color of multiple patches with different digital inputs.

13. A xerographic printer including a processor for correlating uniformity compensations across a plurality of halftone screens by predicting non-uniformities of the plurality of halftone screens based on a measured non-uniformity of a first halftone screen by scaling, for each of the plurality of halftone screens, the measured non-uniformities of the first halftone screen using the equation $R'(x)=S*R(x)+\bar{R}*(1-S)$ where $R_{(x)}$ is a reflectance profile comprising non-uniformities of the first halftone screen, S is a scaling factor computed in accordance with at least one maximized image quality metric, $\bar{R}$ is the mean of $R_{(x)}$, and $R'_{(x)}$ is a reflectance profile of each of the plurality of halftone screens.

14. The printer of claim 13 wherein the processor detects selected cross-position differences in print between the plurality of halftone screens and the first halftone screen, and computes the scaling factor from the differences for predicting the non-uniformities of the plurality.

15. The printer of claim 13 wherein the processor generates spatially varying tone reproduction curve corrections for each of the plurality of halftone screens based upon the predicted non-uniformities.

* * * * *